United States Patent [19]

Surgina et al.

[11] 3,845,662
[45] Nov. 5, 1974

[54] METHOD OF AND MEANS FOR DETERMINING THE THRESHOLD OF SURFACE TEMPERATURES OF HEATED ELEMENTS OF MACHINES, ARTICLES AND OTHER EQUIPMENT

[76] Inventors: Ninel Leonidovna Surgina, ulitsa Bolotnaya, 11, kv. 77, Leningrad; Ljudmila Ivanovna Gurevich, ploschad Lenina, 8/8, kv. 22, Leningrad; Larisa Nikolaevna Yanchenko, naberezhnaya reki Karpovki, 21, kv. 8, Leningrad; Tamara Alexandrovna Bei, ulitsaltd Shmidta, 8, kv. 29, Gatchina; Valentin Nikolaevich Baikov, V.O. Bolshoi prospekt, 33, kv. 10, Leningrad, all of U.S.S.R.

[22] Filed: Mar. 24, 1970

[21] Appl. No.: 22,401

[52] U.S. Cl. ................. 73/358, 106/21, 116/114 V, 116/114.5, 252/408
[51] Int. Cl. .......................................... G01k 11/06
[58] Field of Search .......... 73/356, 358; 116/114 V, 116/114.5; 23/253 TP; 106/21, 27; 252/408

[56] References Cited
UNITED STATES PATENTS

| | | | |
|---|---|---|---|
| 2,269,038 | 1/1942 | Perry | 73/358 |
| 2,799,167 | 7/1957 | Loconti | 73/356 |
| 2,889,799 | 6/1959 | Korpman | 23/253 TP |
| 3,002,385 | 10/1961 | Wahl et al. | 73/358 X |
| 3,465,590 | 9/1969 | Kluth et al. | 73/358 X |

*Primary Examiner*—Richard C. Queisser
*Assistant Examiner*—Frederick Shoon
*Attorney, Agent, or Firm*—Waters, Roditi, Schwartz & Nissen

[57] ABSTRACT

A method for determining the threshold of the surface temperature of heated elements of machines, articles and other equipment, consisting in applying to the surface of the element a coating consisting of a polymer binder and a thermosensitive substance. The thermosensitive substances used are fatty acids and/or salts of these acids, which are capable of melting when heated. When melting occurs, the color of the base which the thermosensitive coating is applied to appears, and this makes it possible to appraise the degree of heating of the surface of the element whose temperature is not lower than the melting point of the thermosensitive substance.

The means for carrying out the above method comprises paper colored in dark tones serving as the base onto which the thermosensitive coating is applied.

4 Claims, 2 Drawing Figures

PATENTED NOV 5 1974 3,845,662
FIG. 1    2 1
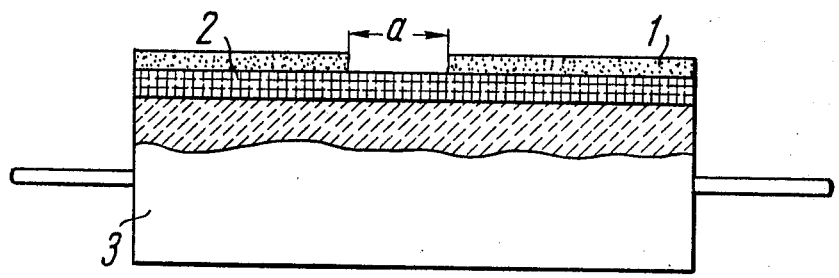
FIG. 2

METHOD OF AND MEANS FOR DETERMINING THE THRESHOLD OF SURFACE TEMPERATURES OF HEATED ELEMENTS OF MACHINES, ARTICLES AND OTHER EQUIPMENT

The present invention relates to a method of and a means for determining the threshold of the surface temperatures of heated elements of machines, articles and other equipment.

The present invention can be used most effectively for measuring the surface temperature of transformers and determining the temperature of soldered connections in oscillator tubes.

Methods are known in the prior art for determining the threshold of the surface temperatures of heated articles by means of thermometric paints or pencils applied thereto which contain hydrated salts of inorganic acids, for example nickel chloride, and urotropin.

These thermometric paints and thermometric pencils are reversible or semireversible within a temperature range of from +40° to +150° C, i.e., after cooling they completely or partly restore their original color.

For this reason they do not allow the threshold of the surface temperature of elements to be determined after they are cooled.

In addition, thermometric paints and thermometric pencils, owing to the reversibility of the substances included in their composition, cannot be employed in places which are practically inaccessible for visual observation.

An object of the present invention is to provide a method for determining the temperature threshold of the heated surface of elements of machines, articles and other equipment and means for carrying out this method with the use of such thermosensitive substances which would make it possible to determine the threshold of the surface temperature of elements after they have been cooled, and also in places practically or absolutely inaccessible for visual observation.

This and other objects are achieved by using a method for determining the threshold of the surface temperature of heated elements of machines, articles and other equipment, wherein, according to the invention there is applied to the surface of the element a coating consisting of a polymer binder and a thermosensitive substance containing fatty acids and/or salts of fatty acids, and which are capable of melting when heated, owing to which the color of the base upon which the coating is applied appears, and the appearance of this color is indicative of the degree of heating of the element surface to a temperature not lower than the melting point of the thermosensitive substance contained in the coating.

The thermosensitive coating can first be applied to a base having the form of a thin sheet, and then this sheet can be glued to the element whose temperature is being determined, and the color of the sheet appearing when the thermosensitive substance melts can be indicative of the degree of heating of the surface.

In the drawing,

FIG. 1 shows a thermosensitive substance applied to the base to form a thermosensitive indicator wherein 1 is the thermosensitive coating and 2 is the base. FIG. 2 shows the same thermosensitive indicator glued to the article 3.

In FIG. 2 in section $a$ the thermosensitive coating has melted and been imbibed into the base 2.

For determining a temperature threshold within 60°–63° C it is expedient to use a 15–25 percent suspension of palmitic acid in alcohol as the thermosensitive substance in the coating.

For determining a temperature threshold within 68°–72° C it is expedient to use a 15–25 percent suspension of stearic acid and iron stearate in alcohol, taken in the proportion of 1:1; within 88°–92° C, a 15–25 percent suspension of stearic acid and magnesium stearate in alcohol, taken in the proportion of 1:1; within 98°–102° C, a 15–25 percent suspension of stearic acid and iron stearate in alcohol, taken in the proportion of 1:5; within 108°–112° C, a 15–25 percent suspension of magnesium stearate in alcohol; within 118°–122° C, a 15–25 percent suspension of stearic acid and zinc stearate in alcohol, taken in the proportion of 1:1; within 127°–132° C, a 15–25 percent suspension of zinc stearate in alcohol; within 144°–146° C, a 15–25 percent suspension of cobalt stearate in alcohol; within 153°–158° C, a 15–25 percent suspension of sodium stearate in alcohol.

A means for carrying out the method of the present invention can comprise paper colored in dark tones serving as the base onto which the thermosensitive coating is applied.

The thermosensitive substance used in the coating applied to the paper designed for determining the threshold of the temperature within 60°–63° C can be palmitic acid; within 68°–72° C, stearic acid and iron stearate taken in the proportion of 1:1; within 88°–92° C, stearic acid and magnesium stearate, taken in the proportion of 1:1; within 98°–102° C, stearic acid and iron stearate, taken in the proportion of 1:5; within 108°–112° C, magnesium stearate; within 118–122° C, stearic acid and zinc stearate, taken in the proportion of 1:1; within 127°–132° C, zinc stearate; within 144°–146° C, cobalt stearate; and within 153°–158° C, sodium stearate.

The invention makes use of the fact that the fatty acids and their salts contained in the coating applied to the surface of the articles are capable of changing their aggregate state at a definite temperature, i.e., melt, thus exposing the surface of the article. The melting point of these substances allows the threshold of the surface temperature of the heated elements to be determined.

If the thermosensitive coating is applied to a base colored in a dark tone, the suspensions of the fatty acids and their salts colored in light tones melt, thus exposing the contrasting base, which makes it possible to observe an instantaneous change of the surface temperature of articles.

Owing to the non-reversibility of the substances comprising the thermosensitive coating, the threshold of the surface temperature of heating can be also determined after some time has elapsed, for example, after the article has cooled or after extraction of the paper with the thermosensitive coating from a place inaccessible for observation.

The nature of the present invention will become more fully apparent from a consideration of the following embodiments of the methods of and means for determining the threshold of surface temperatures of heated articles.

Let us consider several compositions of the thermosensitive coatings.

Example 1

A thermosensitive suspension was prepared for determining the temperature threshold within 60°–63° C.

Molten palmitic acid was poured into ethyl alcohol with intensive mixing of the ingredients. The speed of mixing was 8,000 rpm. The finely dispersed suspension of palmitic acid obtained was filtered through a screen with meshes 0.1 × 0.1 mm in size. Next a 40 percent suspension in ethyl alcohol was prepared with mixing in a ball mill for 2 hours. The components of the suspension were taken in the following amounts:

| | |
|---|---|
| palmitic acid | 100 grams |
| ethyl alcohol | 180 grams. |

Example 2

A thermosensitive 40 percent suspension was prepared for determining the temperature threshold within 68°–72° C. Stearic acid and iron stearate taken in a proportion of 1:1 were ground with ethyl alcohol in a ball mill for 10 hours. The components of the suspension were taken in the following amounts:

| | |
|---|---|
| stearic acid | 100 grams |
| iron stearate | 100 grams |
| ethyl alcohol | 500 grams. |

Example 3

A thermosensitive 50 percent suspension was prepared for determining the temperature threshold within 89°–92° C. Stearic acid and magnesium stearate taken in a proportion of 1:1 were ground with alcohol in a ball mill for 15 hours. The components of the suspension were taken in the following amounts:

| | |
|---|---|
| stearic acid | 100 grams |
| magnesium stearate | 100 grams |
| ethyl alcohol | 400 grams. |

Example 4

A thermosensitive 40 percent suspension was prepared for determining the temperature threshold within 98°–102° C. Stearic acid and iron stearate taken in a proportion of 1:5 were ground with alcohol in a ball mill for 10 hours. The components of the suspension were taken in the following amounts:

| | |
|---|---|
| stearic acid | 50 grams |
| iron stearate | 250 grams |
| ethyl alcohol | 750 grams. |

Example 5

A thermosensitive 50 percent suspension was prepared for determining the temperature threshold within 108°–112° C. Magnesium stearate was ground with alcohol in a ball mill for 12 hours. The components of the suspension were taken in the following amounts:

| | |
|---|---|
| magnesium stearate | 100 grams |
| ethyl alcohol | 200 grams |

Example 6

A thermosensitive 40 percent suspension was prepared for determining the temperature threshold within 118°–122° C. Stearic acid and zinc stearate taken in a proportion of 1:1 were ground with alcohol in a ball mill for 12 hours. The components of the suspension were taken in the following amounts:

| | |
|---|---|
| stearic acid | 100 grams |
| zinc stearate | 100 grams |
| ethyl alcohol | 500 grams. |

Example 7

A thermosensitive 35 percent suspension was prepared for determining the temperature threshold within 127°–132° C. Zinc stearate was ground with alcohol in a ball mill for 3 hours. The components of the suspension were taken in the following amounts:

| | |
|---|---|
| zinc stearate | 70 grams |
| ethyl alcohol | 200 grams. |

Example 8

A thermosensitive 30 percent suspension was prepared for determining the temperature threshold within 144°–146° C. Cobalt stearate was ground with alcohol in a ball mill for 3 hours. The components of the suspension were taken in the following amounts:

| | |
|---|---|
| cobalt stearate | 60 grams |
| ethyl alcohol | 200 grams |

Example 9

A thermosensitive 30 percent suspension was prepared for determining the temperature threshold within 153°–158° C. Sodium stearate was ground with alcohol in a ball mill for 16 hours. The components of the suspension were taken in the following amounts:

| | |
|---|---|
| sodium stearate | 60 grams |
| ethyl alcohol | 200 grams. |

We shall consider the method of the present invention using as an example the determination of the threshold of the surface temperature of an oscillator tube glass bulb with the use of a coating designed for 110° C.

The suspension prepared as described above (see Example 5) was diluted with ethyl alcohol to a concentration of 20–25 percent. As a binder there was added 10 percent polyvinyl butyric varnish in an amount of 20–30 percent of the dry substance.

The white-colored thermosensitive coating obtained in this way was applied with a brush to the surface of the glass bulb.

Upon heating of the tube, when the melting point of the magnesium stearate in the composition of the thermosensitive coating was reached, the latter melted, becoming transparent. As a result the color of the base which the coating was applied to appeared, in the given case the glass of the bulb.

This indicated that the surface of the bulb was heated to the melting point of magnesium stearate, i.e., to a temperature of 110° C.

In the same way it is possible to determine the threshold of the surface temperature of articles with the use of the thermosensitive coating consisting of the suspensions described in Examples 1–4 and 6–9 diluted with ethyl alcohol to a concentration of 20–25 percent with the addition of a binder comprising 10 percent polyvinyl butyric varnish in an amount of 20–30 percent of the dry substance by weight.

The method provided by the invention can be achieved by applying the thermosensitive coating to a base having the form of a thin sheet, for example, fabric, a film or paper. Depending on the adhesive properties of the base material, the thermosensitive suspension described in Examples 1–9 is diluted with ethyl alcohol to a concentration of 15–25 percent, and the 10 percent polyvinyl butyric varnish is added in an amount of 18–30 percent of the dry substance by weight.

For example, if a sheet of paper is used as the base, a suspension prepared as described in Examples 1–9 is diluted with ethyl alcohol to a concentration of 15 percent, and 10 percent polyvinyl butyric varnish is added in an amount up to 20 percent of the dry substance by wieght for obtaining a thermosensitive coating.

To facilitate visual observation of the change in color of the thermosensitive coating, paper colored in dark tones should be selected.

The thermosensitive coating is applied to the paper by means of a roller-coating machine with simultaneous drying.

Black paper with a thermosensitive coat was glued onto the surface of a machine element at a place where visual observation was impossible.

In a certain time after operation of the machine element in its normal thermal conditions, the paper with the thermosensitive coating was removed from the element. The appearance of the color of the paper itself which took place as a result of melting of the thermosensitive coating indicated the temperature of heating of the element surface, which in operation was not lower than the melting point of the thermosensitive substance.

What is claimed is:

1. A method for determining the threshold of the surface temperature of an object which comprises applying to the surface of the object a thermosensitive coating composition consisting essentially of a 15–25 percent suspension of stearic acid and iron stearate in alcohol, taken in the proportion of 1:1, said composition capable of melting when heated to 68°–72° C. as a result of which the color of the object upon which said coating is applied appears, and the appearance of this color is indicative that the surface of said object has attained a temperature not lower than 68°–72° C.

2. A method for determining the threshold of the surface temperature of an object which comprises applying to the surface of the object a thermosensitive coating composition consisting of a 15–25 percent suspension of stearic acid and magnesium stearate in alcohol, taken in the proportion of 1:1, said composition capable of melting when heated to 88°–92° C. as a result of which the color of the object upon which said coating is applied appears, and the appearance of this color is indicative that the surface of said object has attained a temperature not lower than 88°–92° C.

3. A method for determining the threshold of the surface temperature of an object which comprises applying to the surface of the object a thermosensitive coating composition consisting essentially of a 15–25 percent suspension of stearic acid and iron stearate in alcohol, taken in the proportion of 1:5, said composition capable of melting when heated to 98°–102° C. as a result of which the color of the object upon which said coating is applied appears, and the appearance of this color is indicative that the surface of said object has attained a temperature not lower than 98°–102° C.

4. A method for determining the threshold of the surface temperature of an object which comprises applying to the surface of the object a thermosensitive coating composition consisting essentially of a 15–25 percent suspension of stearic acid and zinc stearate in alcohol, taken in the proportion of 1:1, said composition capable of melting when heated to 118°–122° C. as a result of which the color of the object upon which said coating is applied appears, and the appearance of this color is indicative that the surface of said object has attained a temperature not lower than 118°–122° C.

* * * * *